US008713570B2

(12) United States Patent
Watanabe et al.

(10) Patent No.: US 8,713,570 B2
(45) Date of Patent: Apr. 29, 2014

(54) ELECTRONIC DEVICE, INFORMATION PROCESSING METHOD, AND STORAGE MEDIUM

(75) Inventors: Hidehiko Watanabe, Kanagawa (JP); Mayu Kondo, Chiba (JP); Suntao Yan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 327 days.

(21) Appl. No.: 12/829,758

(22) Filed: Jul. 2, 2010

(65) Prior Publication Data

US 2011/0010719 A1  Jan. 13, 2011

(30) Foreign Application Priority Data

Jul. 7, 2009  (JP) .................................. 2009-161106

(51) Int. Cl.
*G06F 9/46* (2006.01)
(52) U.S. Cl.
USPC ............................ 718/102; 717/124; 717/168
(58) Field of Classification Search
None
See application file for complete search history.

(56) References Cited

U.S. PATENT DOCUMENTS

| 8,006,121 | B1* | 8/2011 | Samoilova et al. | 714/2 |
| 2002/0184619 | A1* | 12/2002 | Meyerson | 717/173 |
| 2004/0194100 | A1 | 9/2004 | Nakayama et al. | |
| 2007/0207777 | A1* | 9/2007 | Owen et al. | 455/411 |
| 2008/0263540 | A1* | 10/2008 | Bando et al. | 717/173 |
| 2009/0132745 | A1* | 5/2009 | Watanabe | 710/266 |
| 2009/0235242 | A1* | 9/2009 | Kawaguchi | 717/168 |

FOREIGN PATENT DOCUMENTS

| JP | 2003-173276 A | 6/2003 |
| JP | 2004-13608 A | 1/2004 |
| JP | 2004-94301 A | 3/2004 |
| JP | 2005-18103 A | 1/2005 |
| JP | 2006-92194 A | 4/2006 |
| JP | 2008-21067 A | 1/2008 |
| JP | 2008-52688 A | 3/2008 |
| JP | 2008-269163 | 11/2008 |
| JP | 2009-146387 | 7/2009 |
| JP | 2009-238002 | 10/2009 |
| JP | 2009-271726 | 11/2009 |

OTHER PUBLICATIONS

Office Action issued Aug. 27, 2013, in Japanese Patent Application No. 2009-161106.

\* cited by examiner

*Primary Examiner* — Emerson Puente
*Assistant Examiner* — Dong Kim
(74) *Attorney, Agent, or Firm* — Oblon, Spivak, McClelland, Maier & Neustadt, L.L.P.

(57) ABSTRACT

An electronic device includes a control information storing unit; a setting unit configured to request a user to specify, for each first program in the electronic device, a reception setting indicating whether to allow reception of a second program to be applied to the first program and to store the reception setting as control information for the first program in the control information storing unit, the second program being configured to insert a process in a process of the first program; a reception determining unit configured to determine whether to allow reception of the second program based on the control information for the first program; and a receiving unit configured to receive or refuse to receive the second program according to the determination result of the reception determining unit.

12 Claims, 14 Drawing Sheets

FIG.8

| TARGET PROGRAM ID | RECEPTION OF ADDITIONAL PROGRAM | AUTOMATIC EXECUTION OF ADDITIONAL PROGRAM |
|---|---|---|
| PRINTING APPLICATION | ALLOWED | ALLOWED |
| LOGIN/LOGOUT | ALLOWED | ALLOWED |
| COPYING APPLICATION | ALLOWED | NOT ALLOWED |
| FAX APPLICATION | ALLOWED | ALLOWED |
| SCANNING APPLICATION | NOT ALLOWED | — |
| NETWORK | ALLOWED | NOT ALLOWED |

FIG.10

| TARGET PROGRAM ID | ADDITIONAL PROGRAM ID | STATUS INFORMATION | LOG DESTINATION |
|---|---|---|---|
| NETWORK | SNMP LOG ACQUISITION | RECEIVED | |
| NETWORK | SMB LOG ACQUISITION | RECEIVED | |
| .. | .. | .. | .. |

```
Subject:CARD AUTHENTICATION LOG#0809291455
Date:Mon,29 Sep 2008 15:02:33 +0900
From:MPC4500-1234-110011<****@rrr.co.jp>
To:xxxx@rrr.co.jp

**Method Entry:jp.co.xxx.FeliCaPlugin::inserted(xxx.event.CardEvent)
**Method Entry:jp.co.xxx.FeliCaPlugin::setRealUserID(java.lang.String)
**Method Exit:jp.co.xxx.FeliCaPlugin::setRealUserID(java.lang.String)
**Method Entry:jp.co.xxx.FeliCaPlugin::setRealPassword(java.lang.String)
**Method Exit:jp.co.xxx.FeliCaPlugin::setRealPassword(java.lang.String)
**Method Entry:jp.co.xxx.FeliCaPlugin::getFeliCaIDm()
**Method Exit:jp.co.xxx.FeliCaPlugin::getFeliCaIDm()
**Method Entry:jp.co.xxx.FeliCaPlugin::convertIDm(byte[])
**Method Exit:jp.co.xxx.FeliCaPlugin::convertIDm(byte[])
**Method Entry:jp.co.xxx.FeliCaPlugin::getFeliCaIDm()
**Method Exit:jp.co.xxx.FeliCaPlugin::getFeliCaIDm()
**Method Entry:jp.co.xxx.FeliCaPlugin::setRealFelicaIDm(java.lang.String)
**Method Exit:jp.co.xxx.FeliCaPlugin::setRealFelicaIDm(java.lang.String)
**Method Entry:jp.co.xxx.FeliCaPlugin::getPluginID()
**Method Exit:jp.co.xxx.FeliCaPlugin::getPluginID()
**Method Entry:jp.co.xxx.FeliCaPlugin::inserted(xxx.event.CardEvent)
**Method Entry:jp.co.xxx.FeliCaPlugin::isProtected()
**Method Exit:jp.co.xxx.FeliCaPlugin::isProtected()
**Method Entry:jp.co.xxx.FeliCaPlugin::getUserID()
**Method Exit:jp.co.xxx.FeliCaPlugin::getUserID()
```

ELECTRONIC DEVICE, INFORMATION PROCESSING METHOD, AND STORAGE MEDIUM

BACKGROUND OF THE INVENTION

1. Field of the Invention

A certain aspect of the present invention relates to an electronic device, an information processing method, and a storage medium.

2. Description of the Related Art

Log analysis is a typical method for analyzing (i.e., debugging) an error in a program running on, for example, an embedded device. Normally, instructions (e.g., printf function in C language) are embedded in various places in the source code of a program to output, for example, the values of variables used in the program and information indicating the status of hardware executing the program to a log file. When an error (or failure) occurs, the cause of the error is estimated or identified by analyzing the log file output by the instructions (hereafter called "log output instructions").

However, information in a log file (initial log file) output by log output instructions embedded beforehand in source code is sometimes not enough to perform detailed analysis. In such a case, an approximate location of an error is determined based on the initial log file. Then, the source code of the program is modified so that a more detailed log is output for a portion of the program around the determined location, and the modified source code is compiled and linked to update the program. If the cause of the error cannot be identified even with a log file output from the updated program, further log output instructions are added to the source code and the above steps are repeated. Thus, error analysis based on a log sometimes requires a cumbersome process.

To reduce the workload of analyzing an error, a technology using a diagnostic program has been developed. The diagnostic program can interrupt a process of a running program (target program) to dynamically insert its own process at a desired point (diagnosis point) in the target program and can obtain the values of variables used in the target program (see, for example, Japanese Patent Application Publication No. 2008-269163). After the process of the diagnostic program is completed, the process of the target program is resumed from the interrupted point. This technology makes it possible to output a log of a target program using a diagnostic program without modifying the source code of the target program. Also, this technology enables a user to send a diagnostic program (additional program) via a network to a device running a target program and to remotely control the diagnostic program via the network. Such a remote control feature of a diagnostic program may further increase the convenience for the user (e.g., an administrator, a person in charge of error analysis, etc.).

However, for an end user of a device, the above technology indicates a possibility that a diagnostic program is installed in the device and a log is obtained by the diagnostic program without the knowledge of the end user. In other words, for an end user of a device, the above technology may cause security problems such as leakage of confidential information stored in the device.

SUMMARY OF THE INVENTION

According to an aspect of the present invention, an electronic device includes a control information storing unit; a setting unit configured to request a user to specify, for each first program in the electronic device, a reception setting indicating whether to allow reception of a second program to be applied to the first program and to store the reception setting as control information for the first program in the control information storing unit, the second program being configured to insert a process in a process of the first program; a reception determining unit configured to determine whether to allow reception of the second program based on the control information for the first program; and a receiving unit configured to receive or refuse to receive the second program according to the determination result of the reception determining unit.

Another aspect of the present invention provides an information processing method performed by an electronic device. The information processing method includes the steps of requesting a user to specify, for each first program in the electronic device, a reception setting indicating whether to allow reception of a second program to be applied to the first program and storing the reception setting as control information for the first program in a control information storing unit, the second program being configured to insert a process in a process of the first program; determining whether to allow reception of the second program based on the control information for the first program; and receiving or refusing to receive the second program according to the determination result in the determining step.

BRIEF DESCRIPTION OF THE DRAWINGS

FIG. 8 is a table showing exemplary control information stored in an additional program control information storing unit;

FIG. 10 is a table showing exemplary management information stored in an additional program management information storing unit;

FIG. 14 is a drawing illustrating an exemplary log to be transmitted via email.

DESCRIPTION OF THE PREFERRED EMBODIMENTS

Figure 1:
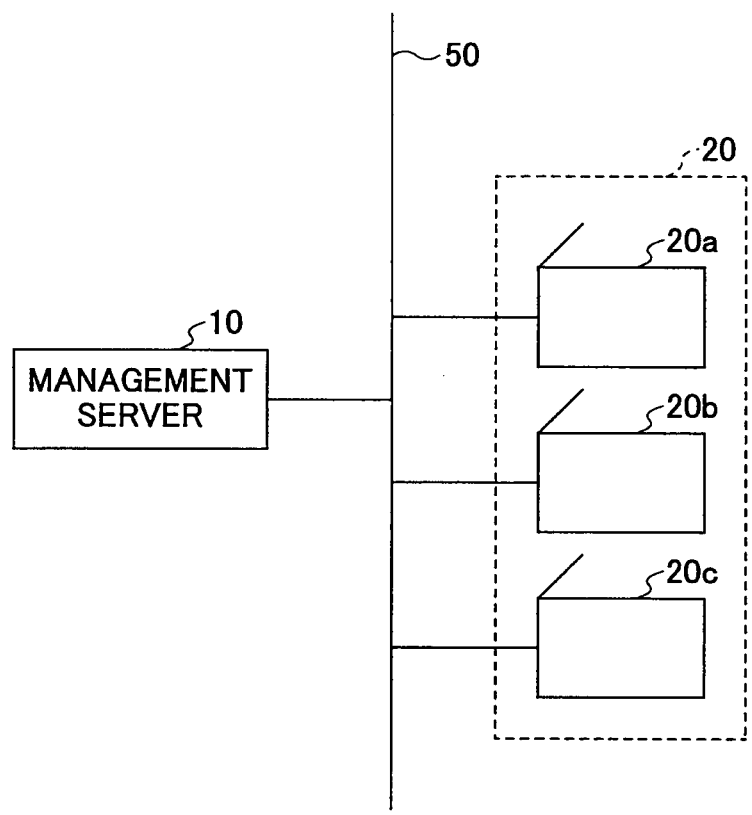
FIG. 1 is a drawing illustrating an exemplary configuration of a device management system according to an embodiment of the present invention.

Preferred embodiments of the present invention are described below with reference to the accompanying drawings. FIG. 1 is a drawing illustrating an exemplary configuration of a device management system 1 according to an embodiment of the present invention. The device management system 1 shown in FIG. 1 includes a management server 10 and devices 20a, 20b, and 20c (may be collectively called a device 20 or devices 20) that are connected via a (wired or wireless) network 50 such as a local area network (LAN) or the Internet.

The device 20 is, for example, an image forming apparatus (multifunction peripheral) that includes functions of a copier, a facsimile machine, a printer, and a scanner in one body. The device 20 includes a CPU and a memory, and implements various functions by executing programs stored in the memory by the CPU. In this embodiment, the device 20 is provided as an example of an electronic device.

The management server 10 is a computer that manages additional programs to be applied to programs (target programs) used in the device 20 and transmits the additional programs to the device 20. In this embodiment, an "additional program" indicates a program that can dynamically insert a process defined in the additional program at a desired point in (a process of) a running "target program" (to which the additional program is to be applied).

Figure 2:
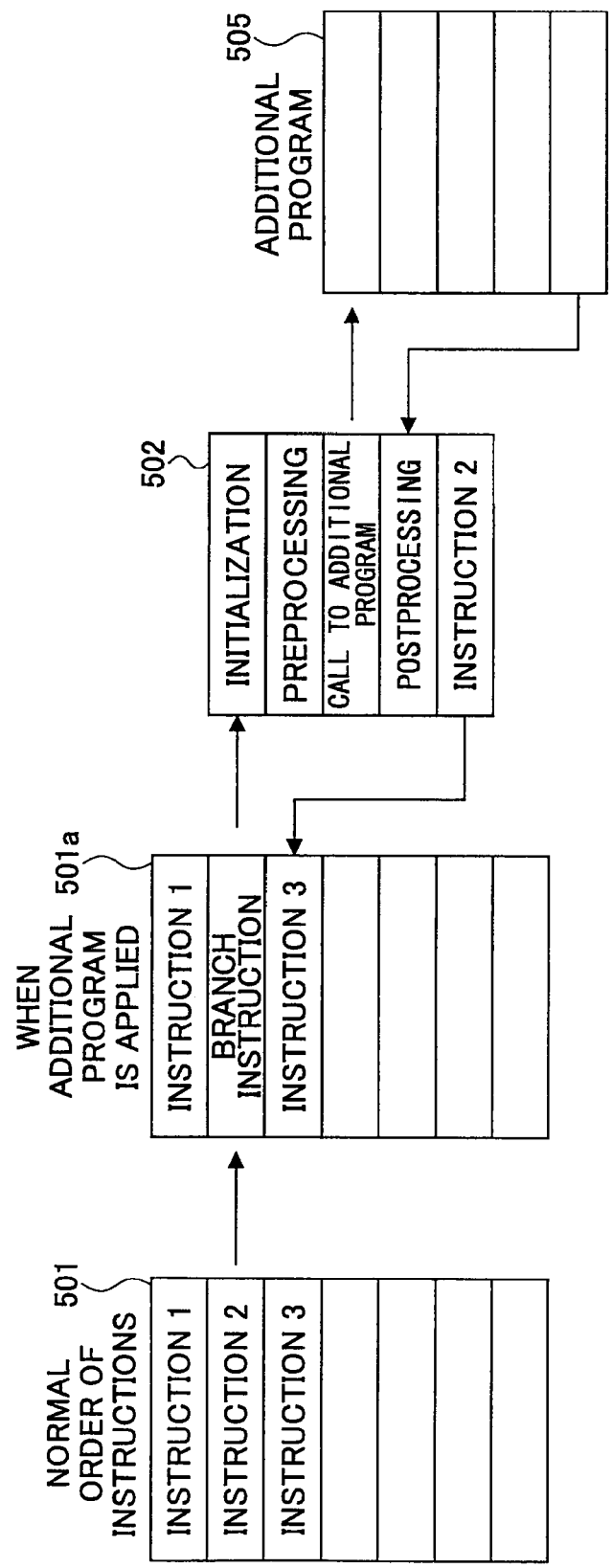
FIG. 2 is a drawing illustrating an example of applying an additional program to a target program.

FIG. 2 is a drawing illustrating an example of applying an additional program to a target program. In FIG. 2, it is assumed that an additional program 505 is applied to a program 501. Instructions 1, 2, and 3 of the target program 501 are initially arranged in a virtual memory as shown by a leftmost block in FIG. 2. In other words, before the additional program 505 is applied to the program 501 (or when the program 501 is executed normally), the instructions 1, 2, and 3 are executed in this order. When the additional program 505 is applied to the program 501, the process of the additional program 505 is inserted between the instructions 1 and 3 as shown by 501a. In this case, the instruction 2 is replaced with a branch instruction that causes a process to branch to a table 502. The table 502 defines a routine where initialization, preprocessing (e.g., saving variables in a stack), a call to the additional program 505, and postprocessing (e.g., fetching the variables saved in the stack) are performed, and then the instruction 2 is executed before the process returns to the instruction 3.

Thus, when an additional program is applied to a target program, the process of the additional program is executed after a specified execution step (or at an addition point) in the target program. After the process of the additional program is completed, the control returns to the target program and the process of the target program is resumed from the addition point. In addition to a process (or instructions) to be inserted into the target program, the additional program includes information indicating the target program and the addition point.

An additional program can refer to, for example, variables used in a target program. Therefore, an additional program can insert into a target program various processes such as a process for outputting log information including variable values at a given point in the target program, a process for fixing a bug, and a process for adding a new function.

Such an additional program makes it possible to output log information regarding a target program, to fix a bug in a target program, or to add a function to a target program without modifying, compiling, linking, and reinstalling the target program. In this embodiment, it is assumed that an additional program is used to output log information regarding a target program.

Also in this embodiment, applying an additional program to a target program to make the additional program executable (as shown in FIG. 2) is called "activation". That is, even if an additional program is received and stored in the device 20, the additional program cannot insert its process into (a process of) a target program until it is activated.

Figure 3:
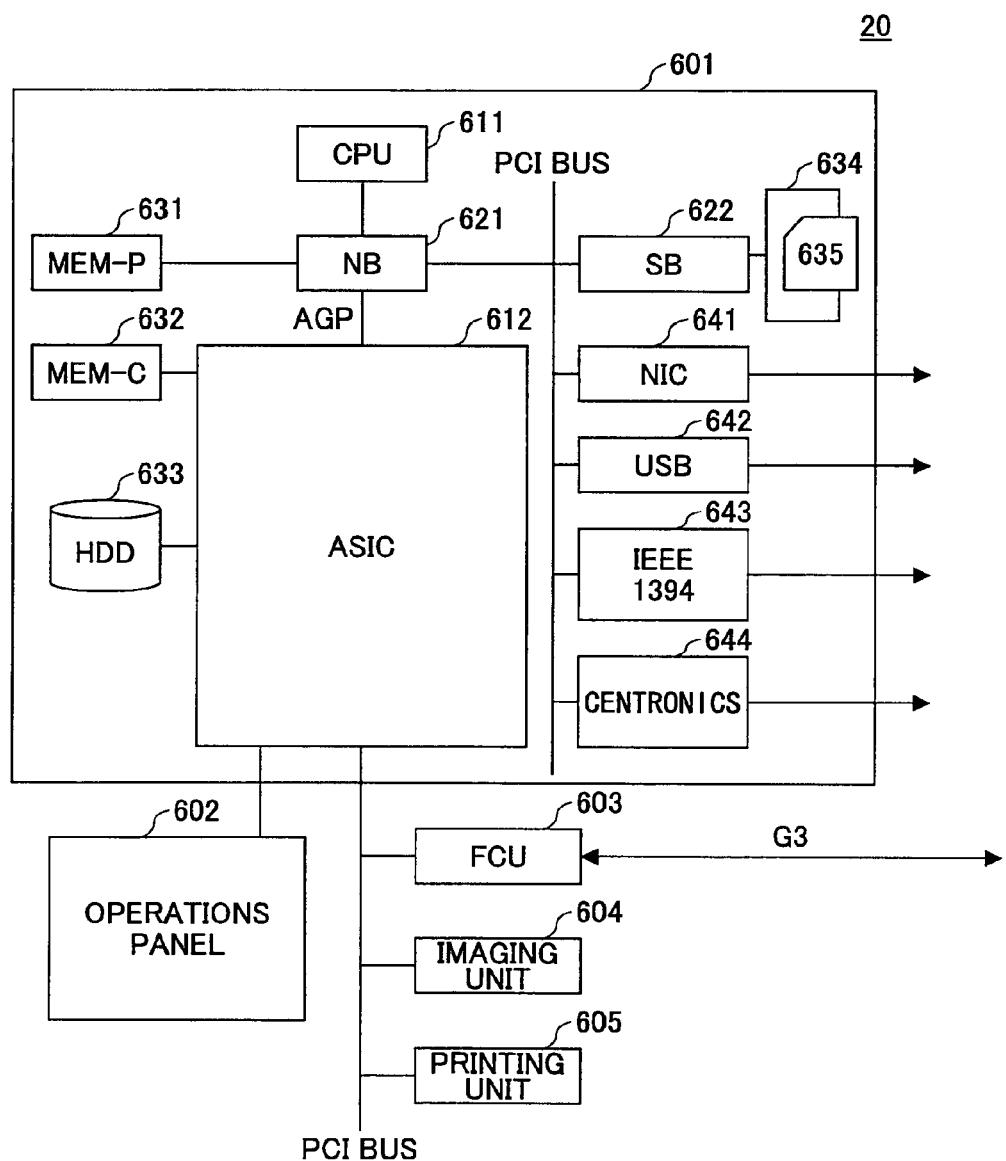
FIG. 3 is a block diagram illustrating an exemplary hardware configuration of a device according to an embodiment of the present invention.

Details of the device 20 are described below. FIG. 3 is a block diagram illustrating an exemplary hardware configuration of the device 20 of this embodiment. As shown in FIG. 3, the device 20 includes a controller 601, an operations panel 602, a facsimile control unit (FCU) 603, an imaging unit 604, and a printing unit 605.

The controller 601 includes a CPU 611, an ASIC 612, an NB 621, an SB 622, a MEM-P 631, a MEM-C 632, a hard disk drive (HDD) 633, a memory card slot 634, a network interface controller (NIC) 641, a USB interface 642, an IEEE 1394 interface 643, and a Centronics interface 644.

The CPU 611 is an IC for information processing. The ASIC 612 is an IC for image processing. The NB 621 is a northbridge of the controller 601. The SB 622 is a southbridge of the controller 601. The MEM-P 631 is a system memory of the device 20. The MEM-C 632 is a local memory of the device 20. The HDD 633 is a storage unit of the device 20. The memory card slot 634 is a card slot for a memory card 635. The NIC 641 is a controller for network communications based on MAC addresses. The USB interface 642 is an interface for connecting devices conforming to the USB standard. The IEEE 1394 interface 643 is an interface for connecting devices conforming to the IEEE 1394 standard. The Centronics interface 644 is an interface for connecting devices conforming to the Centronics standard. The operations panel 602 functions both as a console for user input and a display unit for displaying information output from the device 20.

Figure 4:
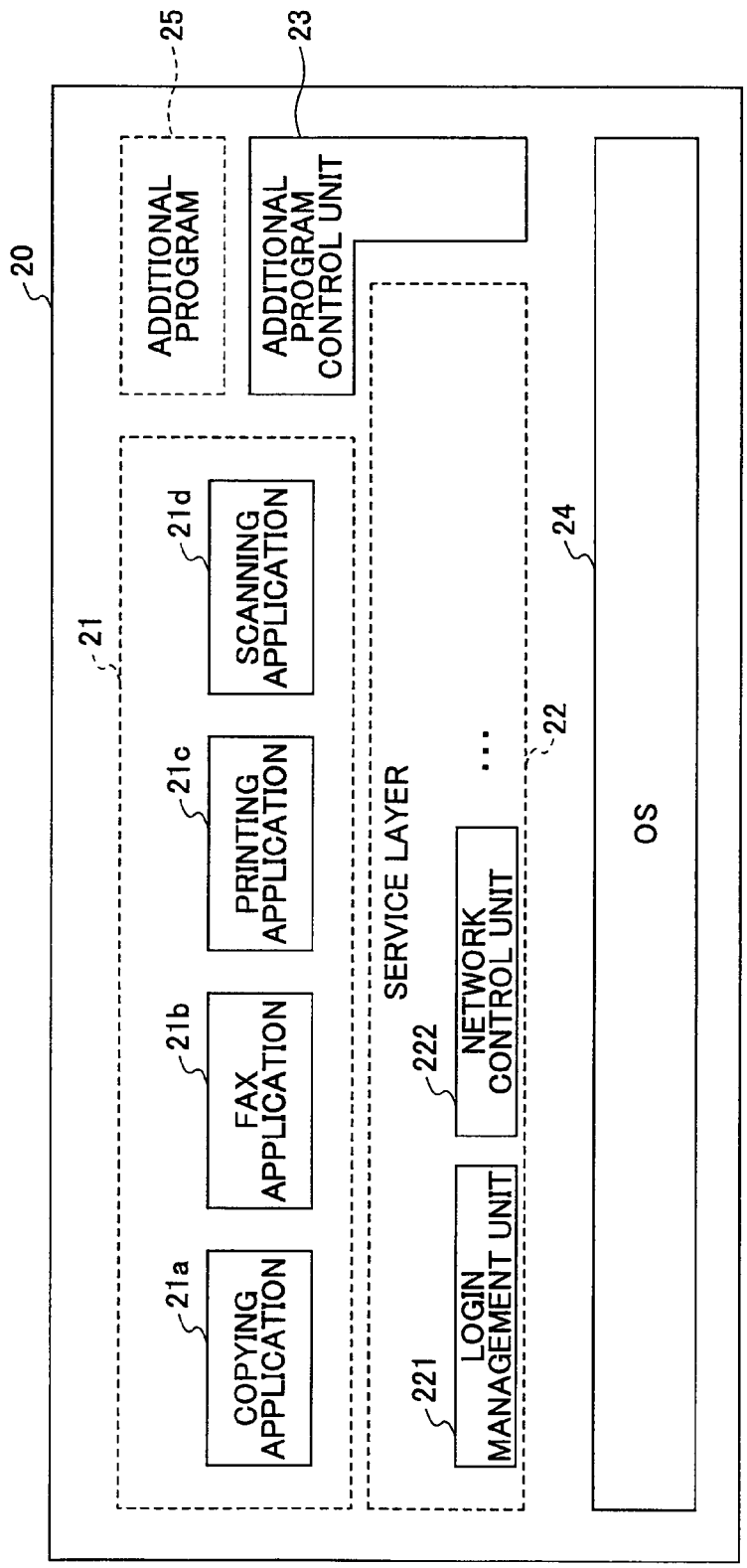
FIG. 4 is a block diagram illustrating an exemplary software configuration of a device according to an embodiment of the present invention.

FIG. 4 is a block diagram illustrating an exemplary software configuration of the device 20 according to an embodiment of the present invention. As shown in FIG. 4, the device 20 includes applications 21 including a copying application 21a, a fax application 21b, a printing application 21c, and a scanning application 21d; a service layer 22; an additional program control unit 23; and an OS 24. These software components are loaded into a RAM of the MEM-P 631 and executed by the CPU 611 to implement their functions.

The copying application 21a provides a copying function. The fax application 21b provides a facsimile function. The printing application 21c provides a printing function. The scanning application 21d provides a scanning function.

The service layer 22 includes programs that provide services (functions) that are commonly used by two or more of the applications 21. In FIG. 4, a login management unit 221 and a network control unit 222 are shown as examples. The login management unit 221 controls login and logout processes for users of the device 20. For example, the login management unit 221 authenticates a user based on authentication information (such as a user name and a password) input by the user and manages the user who is currently logged into the device 20. The network control unit 222 enables the applications 21 to perform communications according to various communication protocols. The service layer 22 may also include programs for controlling hardware of the imaging unit 604 and the printing unit 605, programs for managing storage units such as the MEM-P 631, the MEM-C 632, and the HDD 633, and a program for controlling the operations panel 602.

In this embodiment, it is assumed that the applications 21 and programs in the service layer 22 are target programs to which additional programs are to be applied.

The OS 24 is an operating system. The OS 24 is not limited to a specific operating system.

The additional program control unit 23 provides an execution environment for additional programs (represented by an additional program 25 in FIG. 4). For example, the additional program control unit 23 receives the additional program 25 from the management server 10 and applies the additional program 25 to a target program (i.e., activates the additional program 25).

Figure 5:
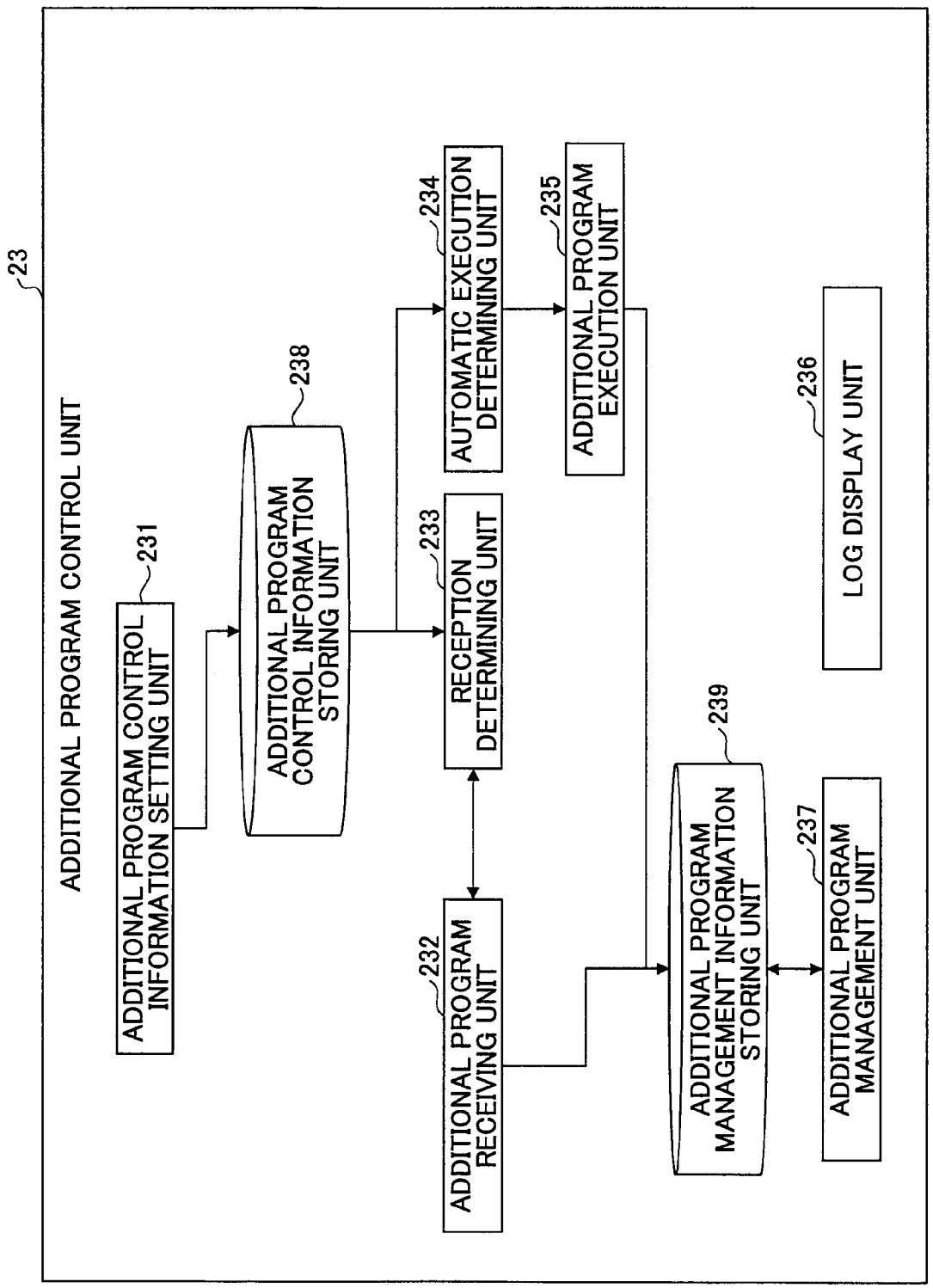
FIG. 5 is a block diagram illustrating an exemplary functional configuration of an additional program control unit.

FIG. 5 is a block diagram illustrating an exemplary functional configuration of the additional program control unit 23. As shown in FIG. 5, the additional program control unit 23 includes an additional program control information setting unit 231, an additional program receiving unit 232, a reception determining unit 233, an automatic execution determining unit 234, an additional program execution unit 235, a log display unit 236, an additional program management unit 237, an additional program control information storing unit 238, and an additional program management information storing unit 239.

The additional program control information setting unit 231 allows (or requests) a user to specify control information defining how to handle additional programs (e.g., whether to allow reception and automatic execution of additional programs), and stores the control information in the additional program control information storing unit 238. The additional program control information storing unit 238 is a storage area for storing the control information and is, for example, provided in the HDD 633. The additional program receiving unit 232 controls a process of receiving additional programs transmitted from the management server 10. The reception determining unit 233 determines whether to allow reception of additional programs transmitted from the management server 10 by referring to the control information in the additional program control information storing unit 238. The automatic execution determining unit 234 determines whether to allow automatic execution of additional programs, which are allowed to be received from the management server 10, by referring to the control information in the additional program control information storing unit 238. The additional program execution unit 235 controls execution (activation) of additional programs. The log display unit 236 controls a process of displaying logs recorded by additional programs. The additional program management unit 237 controls, for example, a process of displaying management information (e.g., status information) of additional programs stored in the additional program management information storing unit 239. The additional program management information storing unit 239 is a storage area for storing the management information of additional programs and is, for example, provided in the HDD 633.

Figure 6:
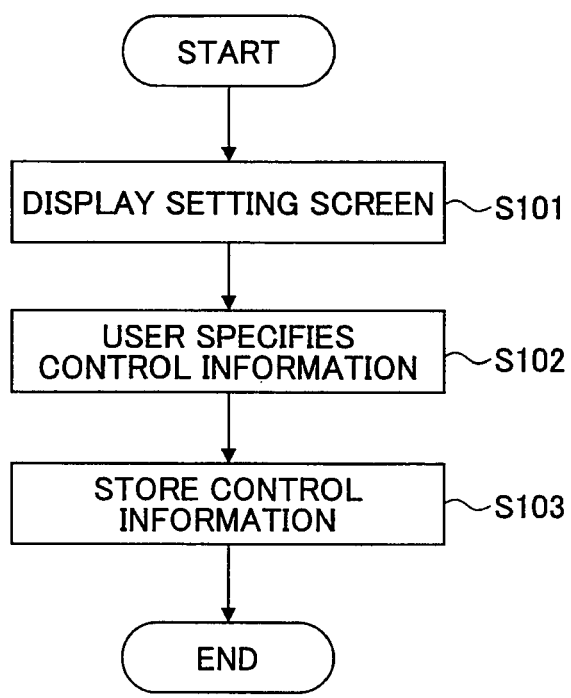
FIG. 6 is a flowchart showing a process of specifying control information indicating whether to allow reception and automatic execution of additional programs.

Exemplary processes performed by the device 20 are described below. FIG. 6 is a flowchart showing a process of specifying control information indicating whether to allow reception and automatic execution of additional programs.

When the user inputs a request to start specification of control information for reception and automatic execution of additional programs via the operations panel 602, the additional program control information setting unit 231 of the additional program control unit 23 displays a setting screen on the operations panel 602 (S101).

Figure 7:
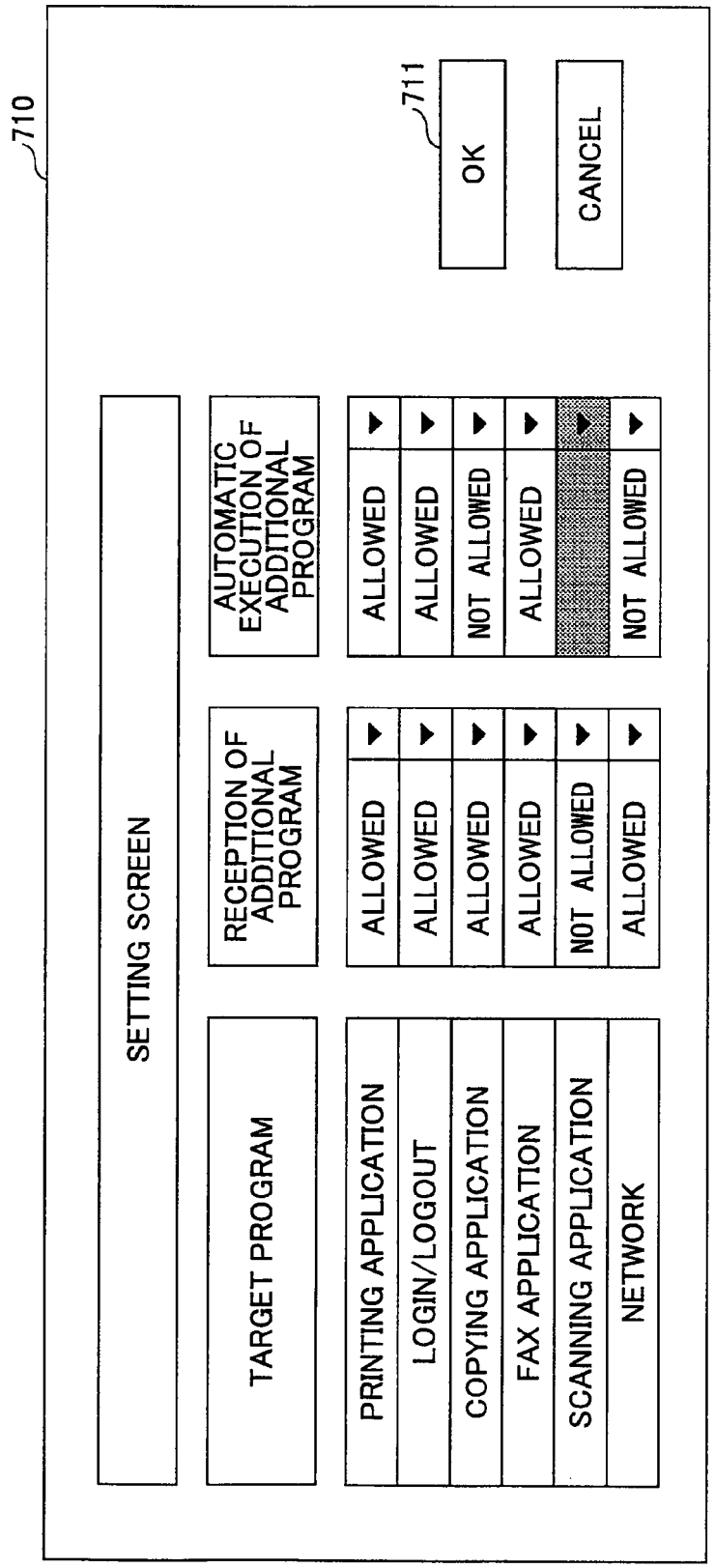
FIG. 7 is a drawing illustrating an exemplary setting screen.

FIG. 7 is a drawing illustrating an exemplary setting screen 710. As shown in FIG. 7, the setting screen 710 includes, for each target program, drop-down list boxes for setting whether to allow reception and automatic execution of additional programs. Automatic execution of additional programs indicates automatically activating the additional programs when received. If the automatic execution of an additional program is not allowed, the additional program is activated manually (in response to a user request).

Each of the drop-down list boxes includes options "Allowed" and "Not Allowed". The screen 710 (or the additional program control information setting unit 231) enables the user to specify, for each target program, a (additional program) reception setting indicating whether to allow reception of additional programs. Also, the screen 710 (or the additional program control information setting unit 231) enables the user to specify, for each target program for which reception of additional programs is allowed, an (additional program) automatic execution setting indicating whether to allow automatic execution of the additional programs. Thus, with the setting screen 710 (or the additional program control information setting unit 231), the user can specify the automatic execution setting only for target programs for which reception of additional programs is allowed. In FIG. 7, reception of additional programs is "Not Allowed" for the scanning application and therefore the drop-down list box for specifying the automatic execution setting for the scanning application is dimmed.

"Printing application", "login/logout", "copying application", "fax application", "scanning application", and "network" shown as target programs in FIG. 7 correspond, respectively, to the printing application 21c, the login management unit 221, the copying application 21a, the fax application 21b, the scanning application 21d, and the network control unit 222 shown in FIG. 4.

A list of the target programs may be pre-stored, for example, in the additional program control information storing unit 238.

When an OK button 711 on the setting screen 710 is pressed by the user after completing the specification (S102), the additional program control information setting unit 231 records (or stores) the specified control information (additional program reception settings and additional program automatic execution settings) in the additional program control information storing unit 238 (S103).

FIG. 8 is a table showing exemplary control information stored in the additional program control information storing unit 238. As shown in FIG. 8, the settings (control information) specified on the setting screen 710 are stored exactly in the additional program control information storing unit 238. In this example, the control information stored in the additional program control information storing unit 238 includes target program IDs, and reception and automatic execution settings associated with the target program IDs. The target program IDs are identification information for the target programs. Although program names are used as the target programs IDs in this example, the target program IDs may be expressed in any code that can be easily processed by a program.

User input in the process of FIG. 6 may instead be performed on a personal computer (PC) connected via a network to the device 20. In this case, the additional program control information setting unit 231 may be configured to provide the setting screen 710 to the PC via the network and to receive settings specified on the screen 710 via the network. Also, the additional program control information setting unit 231 may be implemented as a Web application. In this case, the user can specify the control information using a Web browser of a PC.

Figure 9:
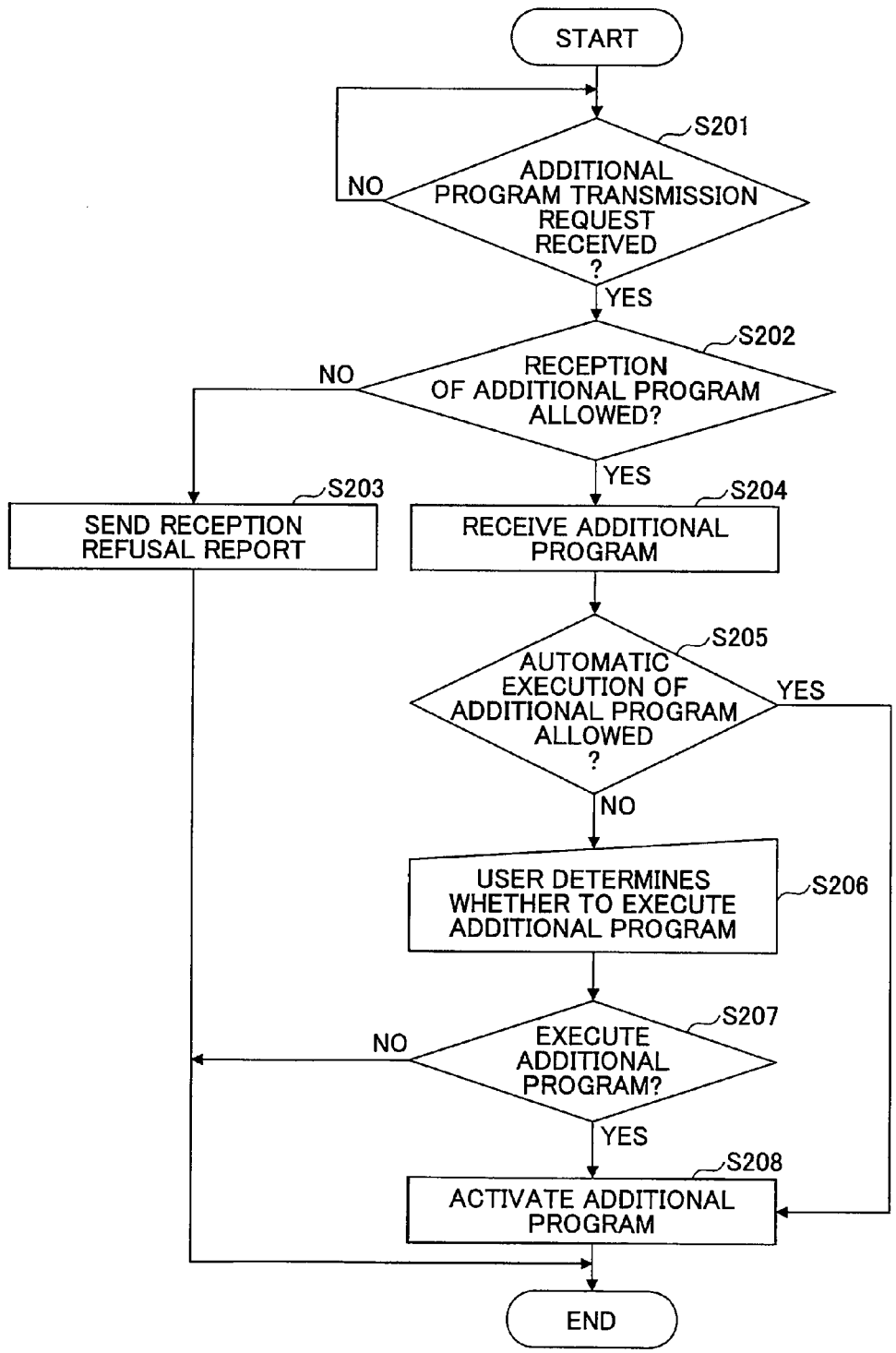
FIG. 9 is a flowchart showing a process, performed by a device, of determining whether to receive and execute an additional program.

Next, a process performed based on the control information stored in the additional program control information storing unit 238 is described. FIG. 9 is a flowchart showing a process, performed by the device 20, of determining whether to receive and execute an additional program.

Additional programs are transmitted irregularly from the management server 10 to the device 20. Therefore, the additional program receiving unit 232 of the additional program control unit 23 constantly monitors a transmission request for an additional program from the management server 10 (S201). When receiving a transmission request for an additional program from the management server 10 (YES in S201), the additional program receiving unit 232 requests the reception determining unit 233 to determine whether to allow reception of the additional program. The transmission request includes identification information (target program ID) of a target program to which the additional program is to be applied. The transmission request may also include the identification information (additional program ID) of the additional program to be transmitted.

The reception determining unit 233 refers to the control information stored in the additional program control information storing unit 238 based on the target program ID in the transmission request and thereby determines whether to allow reception of the additional program (S202). If the reception determining unit 233 determines to not allow the reception of the additional program (NO in S202), the additional program receiving unit 232 returns a reception refusal report to the management server 10 (S203). In other words, the additional program receiving unit 232 refuses to receive the additional program. As a result, the additional program indicated in the transmission request is not received and is not recorded in a memory (e.g., the MEM-P 631) of the device 20.

Meanwhile, if the reception determining unit 233 determines to allow the reception of the additional program (YES in S202), the additional program receiving unit 232 receives the additional program indicated in the transmission request from the management server 10 and stores the received additional program in the memory of the device 20 (S204). In this case, the additional program receiving unit 232 also records management information for the received additional program in the additional program management information storing unit 239.

FIG. 10 is a table showing exemplary management information stored in the additional program management information storing unit 239. As shown in FIG. 10, the additional program management information storing unit 239 stores management information for each additional program received. The management information includes information items such as a target program ID, an additional program ID, status information, and a log destination. The status information indicates either "received" or "in execution". Immediately after an additional program is received, the status information of the received additional program is set to "received". If the additional program is executed (or activated), the status information is changed to "in execution". If the execution or activation of the additional program is cancelled (or the additional program is terminated), the status information returns to "received". The log destination indicates a destination to which a log (file) is output by the additional program. As described later, the user can specify the log destination.

Thus, in step S204 described above, information items of the management information for the received additional program are recorded. As a default value for the log destination, a storage location (e.g., a file name) in the HDD 633 may be recorded. Although the management information for only two additional programs is shown in FIG. 10, the number of additional programs is not limited to a specific value.

Next, the automatic execution determining unit 234 refers to the control information stored in the additional program control information storing unit 238 based on the target program ID in the transmission request and thereby determines whether to allow automatic execution of the additional program (S205). If the automatic execution determining unit 234 determines to allow the automatic execution of the additional program (YES in S205), the additional program execution unit 235 automatically activates the received additional program (S208). After activating the additional program, the additional program execution unit 235 updates the management information for the activated additional program in the additional program management information storing unit 239. More particularly, the additional program execution unit 235 changes the status information from "received" to "in execution".

If the automatic execution determining unit 234 determines to not allow the automatic execution of the additional program (NO in S205), the additional program execution unit 235 displays a screen on the operations panel 602 to request the user to determine whether to execute the received additional program (S206). If the user determines to execute the additional program (e.g., by pressing a YES button on the screen) (YES in S207), the additional program execution unit 235 activates the received additional program and updates the management information in the additional program management information storing unit 239 (S208). If the user determines to not execute the additional program (e.g., by pressing a NO button on the screen) (NO in S207), the additional program execution unit 235 does not activate the received additional program.

Figure 11:
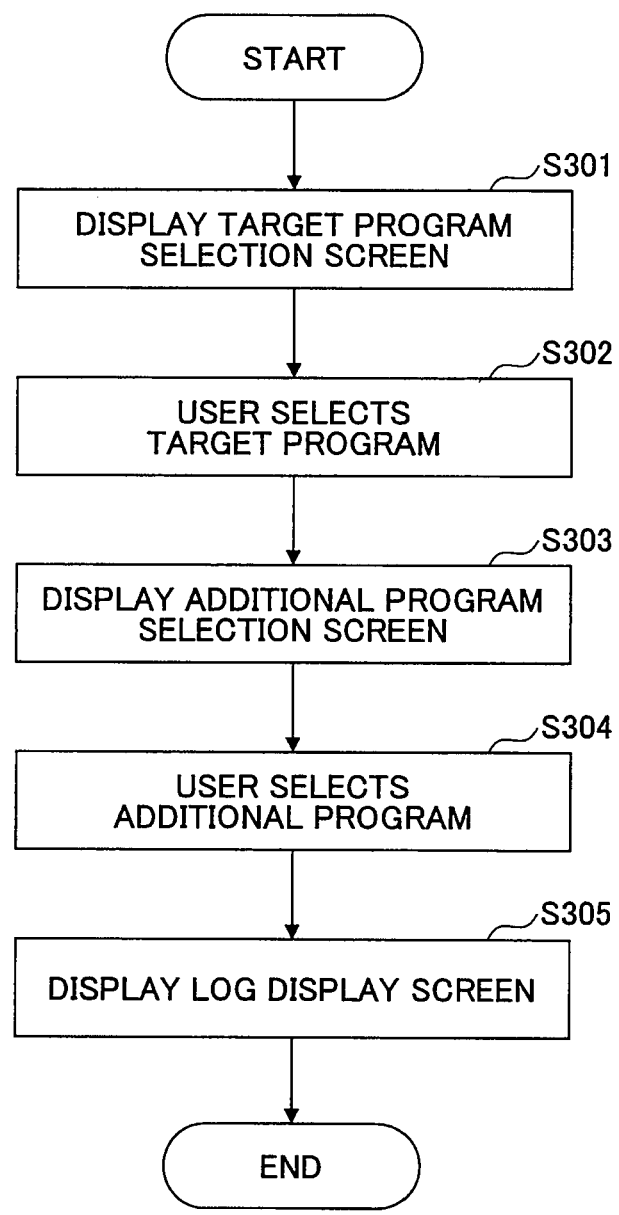
FIG. 11 is a flowchart showing a process of displaying a log recorded by an additional program.

Next, a process of displaying a log recorded by an additional program is described below. FIG. 11 is a flowchart showing a process of displaying a log recorded by an additional program.

When the user inputs a request to display a log via the operations panel 602, the log display unit 236 of the additional program control unit 23 displays a target program selection screen on the operations panel 602 (S301).

Figure 12:
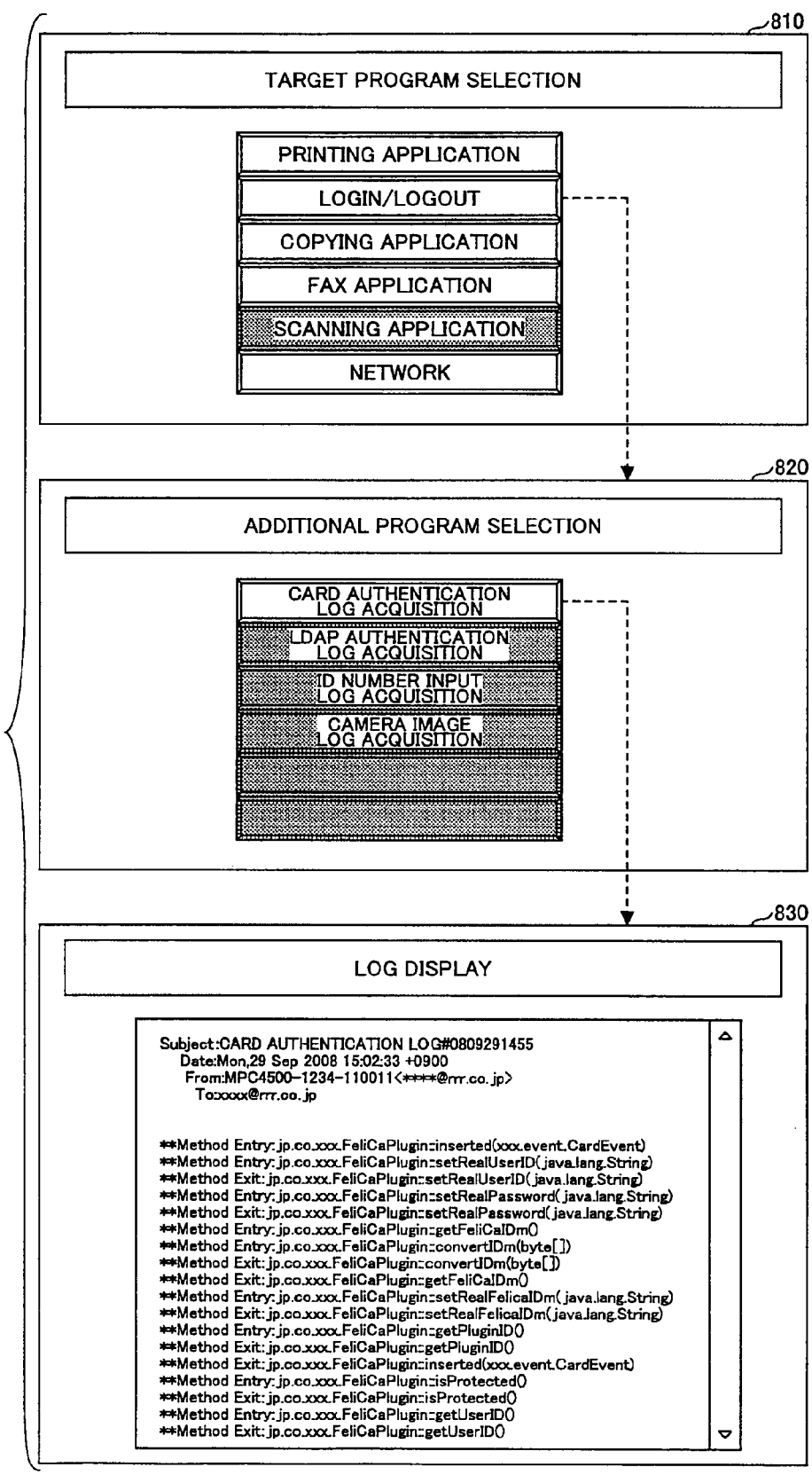
FIG. 12 is a drawing illustrating exemplary screens displayed by a log display unit.

FIG. 12 is a drawing illustrating exemplary screens displayed by the log display unit 236. A target program selection screen 810 shown in FIG. 12 includes buttons for respective target programs. The target program selection screen 810 is displayed based on the control information stored in the additional program control information storing unit 238. More specifically, the log display unit 236 identifies target programs to be displayed on the target program selection screen 810 based on the target program IDs in the control information stored in the additional program control information storing unit 238. Also, the log display unit 236 determines the appearance of buttons representing the target programs based on the additional program reception settings (see FIG. 8) in the control information stored in the additional program control information storing unit 238. Buttons of target programs for which the additional program reception setting is set to "allowed" are made operable, and buttons of target programs for which the additional program reception setting is set to "not allowed" are made inoperable (dimmed). In the example shown in FIG. 8, the additional program reception setting for the scanning application is set to "not allowed". Therefore, on the target program selection screen 810 shown in FIG. 12, the button for the scanning application is dimmed.

When the user selects one of the target programs (S302), the log display unit 236 displays an additional program selection screen 820 on the operations panel 602 (S303).

The additional program selection screen 820 shown in FIG. 12 is based on an assumption that "login/logout" (the login management unit 221) is selected on the target program selection screen 810. The additional program selection screen 820 includes buttons representing additional programs for the "login/logout" (the login management unit 221). The additional program selection screen 820 is displayed based on the management information (see FIG. 10) stored in the additional program management information storing unit 239. Buttons for additional programs the status information of which is not "in execution" are dimmed because no log is recorded if the additional programs are not in execution.

When the user selects one of the additional programs (S304), the log display unit 236 obtains a log recorded by the selected additional program from the log destination specified in the management information, and displays a log display screen 830 showing the obtained log on the operations panel 602 (S305).

The log display screen 830 shown in FIG. 12 is based on an assumption that a "card authentication log acquisition" program is selected on the additional program selection screen 820. Accordingly, the log display screen 830 of FIG. 12 shows a log recorded by the "card authentication log acquisition" program. The exemplary log shown on the log display screen 830 is a method call history.

Normally, a log is viewed by, for example, the developer of a target program or a service person of the device 20, but is not viewed by an "end user" of the device 20. However, in this embodiment, logs are recorded only by additional programs the reception and execution of which are allowed according to end-user settings. In other words, this embodiment allows the end user to determine whether to allow a developer or a service person to obtain and view a log. Compared with a case where additional programs are unconditionally received and executed, this embodiment makes it possible to improve the security for the end user.

The device 20 may also be configured to allow the user to view or confirm the management information stored in the additional program management information storing unit 239. For example, when the user inputs a request to view the management information via the operations panel 602, the additional program management unit 237 displays management screens on the operations panel 602 to allow the user to view the management information for received (downloaded) additional programs.

Figure 13:
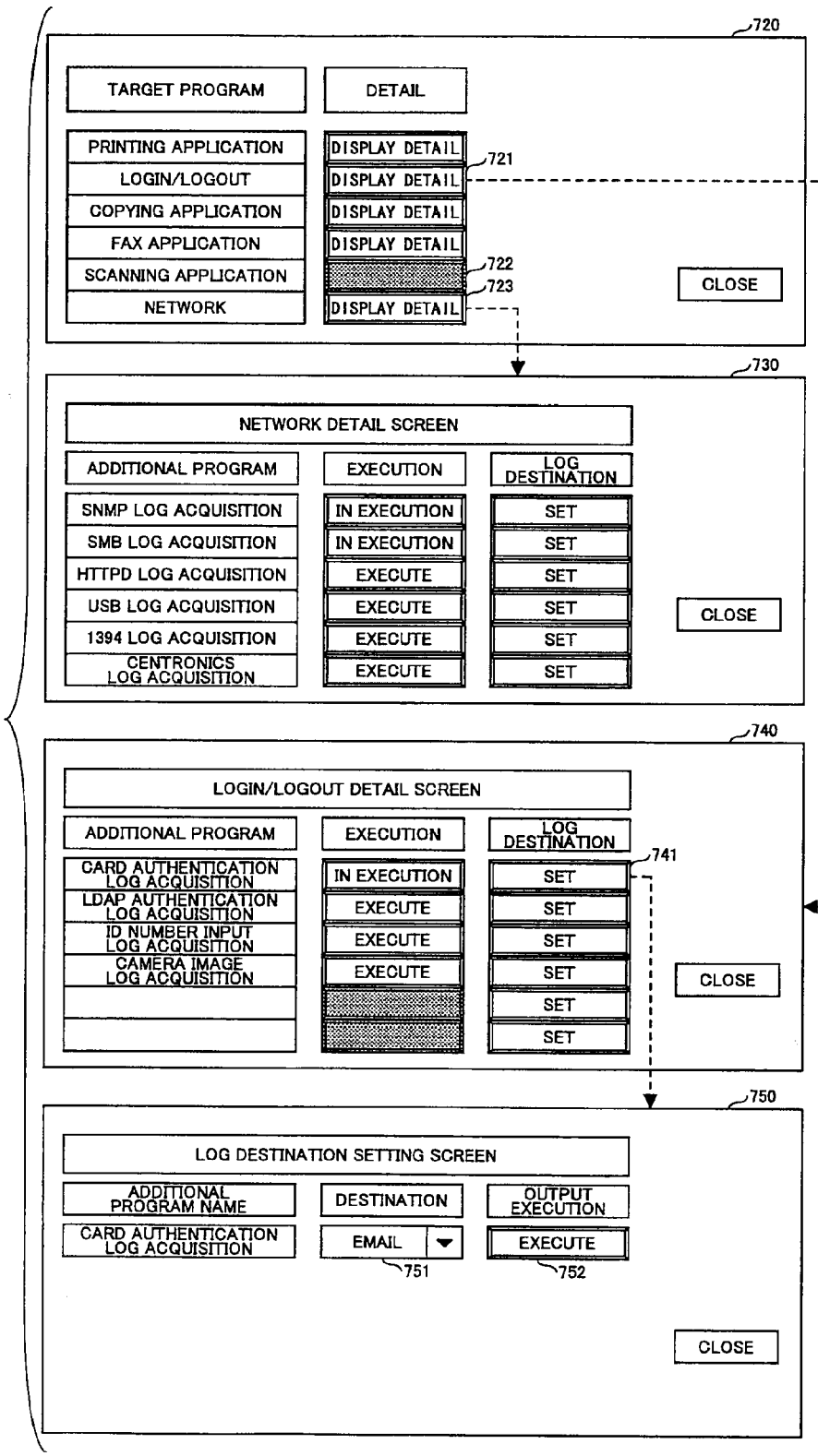
FIG. 13 is a drawing illustrating exemplary management screens.

FIG. 13 is a drawing illustrating exemplary management screens. As shown in FIG. 13, a main screen 720 is displayed first. The main screen 720 includes a "Display Detail" button for each target program. Similarly to the target program selection screen 810, the main screen 720 is displayed based on the control information stored in the additional program control information storing unit 238.

When the user presses one of the "Display Detail" buttons on the main screen 720, the additional program management unit 237 obtains the management information of additional programs associated with the corresponding target program from the additional program management information storing unit 239, and displays a detail screen based on the obtained management information on the operations panel 602.

When, for example, the user presses a "Display Detail" button 723 corresponding to "network", a network detail screen 730 is displayed. Meanwhile, if the user presses a "Display Detail" button 721 corresponding to "login/logout", a login/logout detail screen 740 is displayed.

On each detail screen, a list of additional programs for the corresponding target program is displayed based on the management information. For example, on the network detail screen 730, additional programs including "SNMP log acquisition", "SMB log acquisition", "HTTPD log acquisition", "USB log acquisition", "1394 log acquisition", and "Centronics log acquisition" for the network control unit 222 ("network") are displayed. Similarly, on the login/logout detail screen 740, additional programs including "card authentication log acquisition", "LDAP authentication log acquisition", "ID number input log acquisition", and "camera image log acquisition" for the login management unit 221 ("login/logout") are displayed.

Here, "camera image log acquisition" is an additional program that inserts a process into a process of the login management unit 221. For example, when a user trying to log in is detected by the login management unit 221, "camera image log acquisition" takes an image of the user with a digital camera connected to the device 20 and records the image in the HDD 633. Thus, a log recorded (or obtained) by an additional program is not limited to text information (character strings), but may be image data (still image or video) or audio data.

Each detail screen also includes an execution button and a log destination setting button for each additional program.

The execution button is used to execute the corresponding additional program. When the user presses the execution button, the additional program execution unit 235 executes the corresponding additional program. If an additional program has already been automatically executed, a label "in execution" is displayed on the corresponding execution button.

The log destination setting button is used to set a destination to which a log is output. For example, when the user presses a log destination setting button 741 corresponding to "card authentication log acquisition" on the login/logout detail screen 740, the additional program management unit 237 displays a log destination setting screen 750 on the operations panel 602.

The log destination setting screen 750 includes a list box 751 for selecting a destination of a log recorded by "card authentication log acquisition" and an output execution button 752 for outputting the log to the selected destination. The list box 751 enables the user to select a destination. Examples of destinations include "email", "HDD", and "server". When "email" is selected, the log is transferred via email. When "HDD" is selected, the log is stored in the HDD 633. When "server" is selected, the log is transferred to a specified server. If the log destination for "card authentication log acquisition" is specified in the management information stored in the additional program management information storing unit 239, the specified log destination is displayed in the list box 751. Meanwhile, when a destination is selected with the list box 751, the additional program management unit 237 updates the log destination for "card authentication log acquisition" in the management information stored in the additional program management information storing unit 239.

The output execution button 752 is normally used when "email" or "server" is selected to transfer a log to the selected destination. When the output execution button 752 is pressed while "email" is selected as shown in FIG. 13, the additional program management unit 237 transfers a log obtained by "card authentication log acquisition" via email.

FIG. 14 is a drawing illustrating an exemplary log to be transmitted via email. The exemplary log shown in FIG. 14 is a method call history. When "email" is selected as a log destination, the additional program management unit 237 may be configured to allow the user to set an email address.

As described above, the above embodiment makes is possible for a user (particularly, an end user) to determine whether to allow reception and automatic execution of additional programs. This in turn makes it possible to improve the security in using additional programs.

An aspect of the present invention makes it possible to improve the security in using a program that can dynamically insert its own process into a process of another program.

In the above embodiment, an image forming apparatus is used as an example of an electronic device. However, the present invention may be applied to any appropriate electronic device. For example, the present invention may be applied to various digital consumer products, mobile devices, and general-purpose computers.

Functions of an electronic device according to the above embodiments may be implemented by program code stored in a computer-readable storage medium such as a CD-ROM, a DVD, and an HDD.

The present invention is not limited to the specifically disclosed embodiments, and variations and modifications may be made without departing from the scope of the present invention.

The present application is based on Japanese Priority Application No. 2009-161106, filed on Jul. 7, 2009, the entire contents of which are hereby incorporated herein by reference.

What is claimed is:

1. An electronic device, comprising:
   a memory that stores control information; and
   a processor that instructs:
   a setting unit that requests a user to specify, for each of a plurality of target programs in the electronic device, a reception setting indicating whether to allow reception of an additional program to be applied to each of the plurality of target programs and to store the reception setting as control information for the plurality of target programs in the control information storing unit, the additional program inserting a process interrupt in a process of at least one of the plurality of target programs;
   a reception determining unit that determines whether to allow reception of the additional program based on the control information for the plurality of target programs and a transmission request for the additional program, and generates a reception refusal report upon determination that reception of the additional program is not allowed; and
   a receiving unit that continually monitors for the transmission request for the additional program, receives or refuses to receive the additional program according to the determination result of the reception determining unit, and, transmits, when the reception determining unit generates the reception refusal report, the reception refusal report to a management server.

2. The electronic device as claimed in claim 1, the processor further instructing:
   an automatic execution determining unit; and
   an execution unit, wherein
   the setting unit requests the user to specify an automatic execution setting indicating whether to allow automatic execution of the additional program if the reception setting for a respective target program is specified to allow reception of the additional program, and stores the reception setting and the automatic execution setting as the control information for the plurality of target programs in the control information storing unit,
   the automatic execution determining unit determines whether to allow automatic execution of the additional program based on the control information for the plurality of target programs when the additional program is received, and
   the execution unit automatically applies the additional program to the respective target program if the automatic execution determining unit determines to allow automatic execution of the additional program.

3. The electronic device as claimed in claim 2, wherein the process of the at least one of the plurality of target programs includes one or more instructions, and
   the process interrupt does not modify the one or more instructions.

4. The electronic device as claimed in claim 1, wherein the additional program outputs a log regarding the at least one of the plurality of target programs.

5. An information processing method performed by an electronic device, the information processing method comprising the steps of:
   requesting a user to specify, for each of a plurality of target programs in the electronic device, a reception setting indicating whether to allow reception of an additional program to be applied to each of the plurality of target programs and storing the reception setting as control information for the plurality of target programs in a control information storing unit, the additional program inserting a process interrupt in a process of at least one of the target programs;
   determining whether to allow reception of the additional program based on the control information for the plurality of target programs and a transmission request for the additional program;
   generating a reception refusal report upon determination that reception of the additional program is not allowed;
   continually monitoring for the transmission request for the additional program;
   receiving or refusing to receive the additional program according to the determination result in the determining step; and
   transmitting, when the reception refusal report is generated, the reception refusal report to a management server.

6. The information processing method as claimed in claim 5, further comprising the steps of:
   requesting the user to specify an automatic execution setting indicating whether to allow automatic execution of the additional program if the reception setting for a respective target program is specified to allow reception of the additional program and storing the reception setting and the automatic execution setting as the control information for the plurality of target programs in the control information storing unit;
   determining whether to allow automatic execution of the additional program based on the control information for the plurality of target programs when the additional program is received; and
   automatically applying the additional program to the respective target program upon determination that automatic execution of the additional program is allowed.

7. The information processing method as claimed in claim 6, wherein the process of the at least one of the plurality of target programs includes one or more instructions, and
   the process interrupt does not modify the one or more instructions.

8. The information processing method as claimed in claim 5, wherein the additional program outputs a log regarding the at least one of the plurality of target programs.

9. A non-transitory computer-readable storage medium having instructions stored therein, which when executed by a processor in an electronic device, causes the processor to perform an information processing method, the information processing method comprising the steps of:
   requesting a user to specify, for each of a plurality of target programs in the electronic device, a reception setting indicating whether to allow reception of a an additional program to be applied to each of the plurality of target programs and storing the reception setting as control information for the plurality of target programs in a control information storing unit, the additional program inserting a process interrupt in a process of at least one of the target programs;

determining whether to allow reception of the additional program based on the control information for the plurality of target programs and a transmission request for the additional program;

generating a reception refusal report upon determination that reception of the additional program is not allowed;

continually monitoring for the transmission request for the additional program;

receiving or refusing to receive the additional program according to the determination result in the determining step; and transmitting, when the reception refusal report is generated, the reception refusal report to a management server.

10. The non-transitory computer-readable storage medium as claimed in claim 9, the information processing method further comprising the steps of:

requesting the user to specify an automatic execution setting indicating whether to allow automatic execution of the additional program if the reception setting for a respective target program is specified to allow reception of the additional program and storing the reception setting and the automatic execution setting as the control information for the plurality of target programs in the control information storing unit;

determining whether to allow automatic execution of the additional program based on the control information for the plurality of target programs when the additional program is received; and automatically applying the additional program to the respective target program upon determination that automatic execution of the additional program is allowed.

11. The non-transitory computer-readable storage medium as claimed in claim 10, wherein the process of the at least one of the plurality of target programs includes one or more instructions, and the process interrupt does not modify the one or more instructions.

12. The non-transitory computer-readable storage medium as claimed in claim 9, wherein the additional program outputs a log regarding the at least one of the plurality of target programs.

* * * * *